(12) United States Patent
Glück et al.

(10) Patent No.: US 10,363,504 B2
(45) Date of Patent: Jul. 30, 2019

(54) FILTER DEVICE FOR FILTERING LIQUIDS

(75) Inventors: Oliver Glück, Stuttgart (DE);
Yashwant Udachan, Akkalkot (IN);
Martin Klein, Ludwigsburg (DE);
Frank Pflüger, Sachsenheim (DE)

(73) Assignee: MANN+HUMMEL GmbH, Ludwigsburg (DE)

( * ) Notice: Subject to any disclaimer, the term of this patent is extended or adjusted under 35 U.S.C. 154(b) by 667 days.

(21) Appl. No.: 13/376,355

(22) PCT Filed: Jun. 2, 2010

(86) PCT No.: PCT/EP2010/057668
§ 371 (c)(1),
(2), (4) Date: Feb. 17, 2012

(87) PCT Pub. No.: WO2010/139706
PCT Pub. Date: Dec. 9, 2010

(65) Prior Publication Data
US 2012/0132582 A1    May 31, 2012

(30) Foreign Application Priority Data
Jun. 4, 2009 (DE) .................... 10 2009 023 951

(51) Int. Cl.
*B01D 35/30* (2006.01)
*B01D 35/31* (2006.01)

(52) U.S. Cl.
CPC ...... *B01D 35/31* (2013.01); *B01D 2201/0415* (2013.01); *B01D 2201/403* (2013.01)

(58) Field of Classification Search
None
See application file for complete search history.

(56) References Cited

U.S. PATENT DOCUMENTS

| 1,059,370 | A | * | 4/1913 | Johnson | E03B 7/10 138/28 |
| 3,552,553 | A | * | 1/1971 | Reading | 210/484 |
| 5,807,415 | A | * | 9/1998 | Leo | 55/385.3 |
| 7,481,319 | B2 | | 1/2009 | Jokschas et al. | |
| 2003/0209482 | A1 | * | 11/2003 | Klotz et al. | 210/435 |
| 2005/0077230 | A1 | * | 4/2005 | Jokschas et al. | 210/446 |
| 2011/0210053 | A1 | * | 9/2011 | Strassenberger | B01D 35/30 210/184 |

FOREIGN PATENT DOCUMENTS

| DE | 202007010956 | * 12/2008 | ............. B01D 35/30 |
| EP | 0088148 A2 | 9/1983 | |
| EP | 1510239 A1 | 3/2005 | |

OTHER PUBLICATIONS

13376355—Portion of Office Action dated May 22, 2014, 4 pages.*
International Search Report of PCT/EP2010/057668.

* cited by examiner

*Primary Examiner* — Bobby Ramdhanie
*Assistant Examiner* — Denise R. Anderson
(74) *Attorney, Agent, or Firm* — James Hasselbeck

(57) ABSTRACT

The invention relates to a filter device (1) for filtering liquids, comprising: a filter element (2) having an interior (3) for accommodating a liquid, and a compensating element (5) made of elastically deformable material for accommodating a liquid volume that increases when the liquid freezes. The compensating element (5) is arranged in the interior (3), and a gap (6), in particular an annular gap, for accommodating the liquid is formed between the compensating element (5) and the filter element (3).

8 Claims, 4 Drawing Sheets

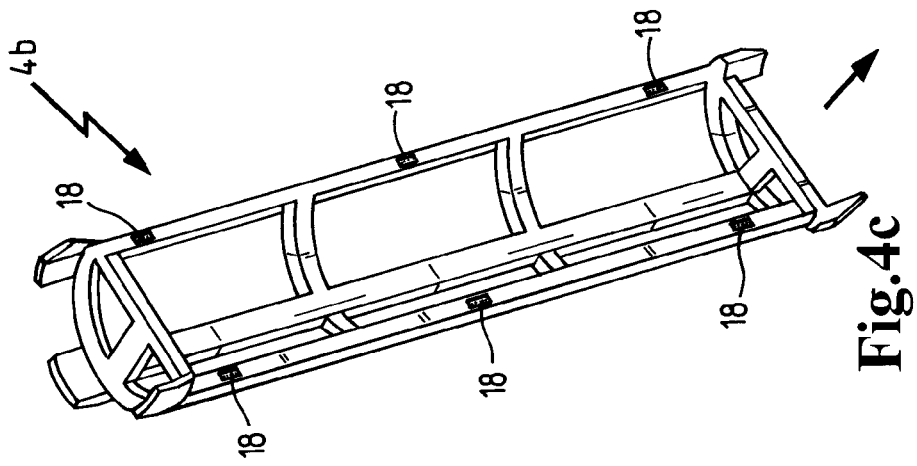
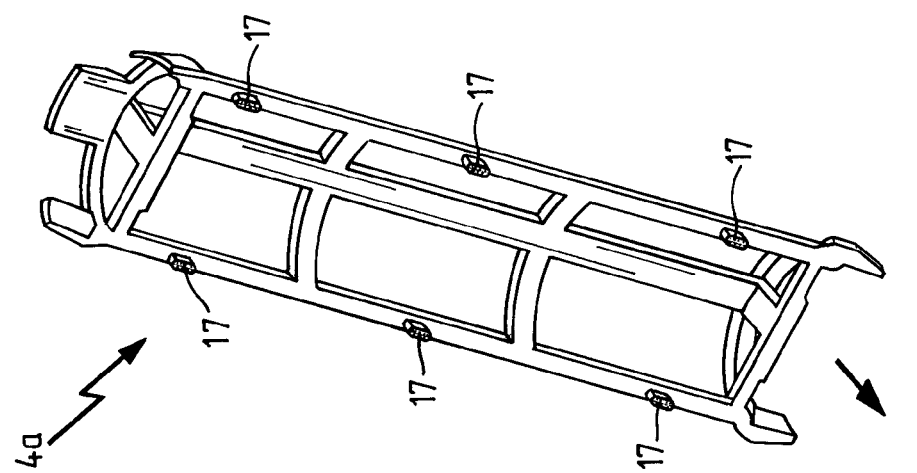
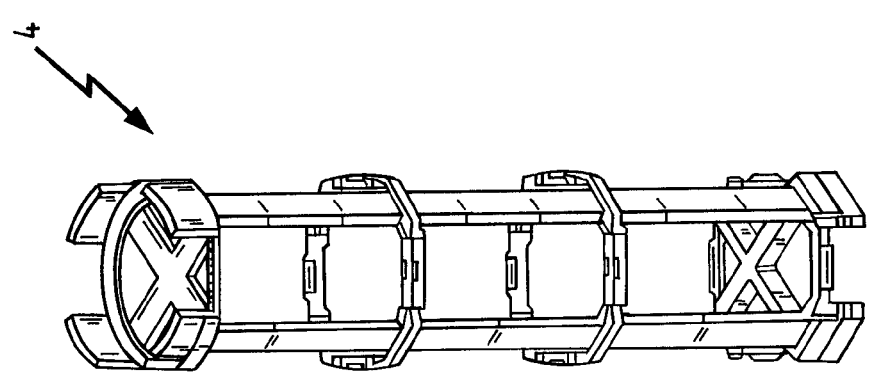
Fig.4c
Fig.4b
Fig.4a

FILTER DEVICE FOR FILTERING LIQUIDS

CROSS REFERENCE TO RELATED APPLICATIONS

This application is US National Stage Entry of international patent application no. PCT/EP2010/057668, filed Jun. 2, 2010 designating the United States of America, the entire disclosure of which is incorporated herein by reference. Priority is claimed based on Federal Republic of Germany patent application no. 10 2009 023 951.0, filed Jun. 4, 2009.

TECHNICAL FIELD

The invention concerns a filter device for the filtration of liquid, comprising: a filter element with an interior for receiving a liquid as well as at least one compensation element of elastically deformable material for receiving a liquid volume increasing upon freezing of the liquid. Such filter devices are known in various areas and serve, for example, for filtration of aqueous urea solution that is employed in exhaust gas treatment in motor vehicles for reducing the nitrous oxide emissions or for filtration of other typically aqueous liquids, for example, of fuel/water mixtures.

PRIOR ART

DE 10 220 672 A discloses a filter unit for liquids that freeze, in particular for a metering block of an exhaust gas treatment unit. The filter unit has at least one filter insert that is arranged in a housing wherein the filter insert at least partially is surrounded by an elastically deformable jacket part. The elastically deformable jacket part is designed to compensate the volume change caused by freezing of the liquid in that the jacket part yields to the liquid pressure with elastic deformation in outward direction.

DE 103 40 123 A1 discloses a filter device for liquid filtration that comprises a filter element arranged in a filter housing wherein in the filter housing a deformable expansion element (cover, ring, bottom disk) is arranged whose deformation changes the volume at least of a section of the flow path of the liquid to be filtered within the filter housing. The expansion element can be embodied, for example, in the form of an elastically deformable cover that is placed onto the filter element and that separates the raw side from the clean side of the filter device. Upon freezing of the liquid in an inflow area at the raw side, the cover is deformed axially in the direction of an interior of the filter element so that the volume of the inflow space is enlarged while the volume available in the interior is reduced.

It is the object of the invention to further develop a filter element of the aforementioned kind in such a way that the filter element is protected from the pressure of the ice of a liquid contained in the interior of the filter element.

SUMMARY OF THE INVENTION

This object is solved by a filter device of the aforementioned kind in which the compensation element is arranged in the interior and a gap, in particular an annular gap, for receiving the liquid is provided between the compensation element and the filter element.

According to the invention, it is proposed to arranged in the interior a compensation element that upon expansion of the freezing liquid is compressed in the gap so that the volume enlargement of the liquid can be substantially compensated by compression, i.e., a reduction of the inherent volume of the compensation element. The compensation element is compressed by the freezing liquid because in the interior there is no compensation volume for the compensation element available.

The interior and the compensation element can be, for example, cylindrical and can be designed with minimally differing diameters so that after the introduction of the compensation element into the interior an annular gap between the wall surface of the compensation element and the inner wall surface of the filter element, also cylindrical, is formed. In this connection, the elastically deformable material of the compensation element can be comprised of rubber, in particular of an elastomer such as EPDM.

In one embodiment the compensation element fills out in the undeformed state at least 40%, preferably at least 80%, of the volume of the interior. In this way, it is ensured that the liquid volume in the interior and thus also the enlargement of the liquid volume upon freezing is so small that it can be compensated effectively by elastic deformation (compression) of the compensation element. The deformation of the compensation element can take place in this connection in radial direction as well as in axial direction in case the compensation element does not extend across the entire axial length of the interior corresponding to the axial length of the filter element.

In a further embodiment, a support body for supporting the filter element is arranged in the interior, in particular in the gap. The support body in this connection is expediently designed such that it allows for axial as well as radial flow of the liquid through the (annular) gap.

In a further embodiment, the support body is embodied as a tubular body, in particular in the shape of a cage. The tubular support body surrounds typically the compensation element at least partially on the jacket side. By the configuration of the support body in the form of a cage, despite the arrangement of the support body in the gap, it can be ensured that the liquid is in immediate contact with the compensation element so that the latter can be compressed. In this connection, the cage can have a plurality of webs that extend in the longitudinal direction of the filter element and the webs can be connected with each other by rings that extend in radial direction. The support body is comprised in this connection usually of a plastic material and is of a one-part configuration.

In a further embodiment the support body that is in particular monolithic has circumferentially an opening for insertion of the compensation element which opening extends at least across a portion of the axial length of the support body. Upon insertion of the compensation element through the opening into the support body, the compensation element can be elastically compressed so that the opening can be dimensioned smaller than the contour of the compensation element in the undeformed state.

In particular, the opening in radial direction can extend about an angular range of less than 270 degrees, preferably less than 130 degrees. Even when the diameter of the compensation element substantially matches the inner diameter of the support body, the compensation element with elastic deformation can be introduced through the opening into the interior of the support body. As a result of the relatively minimal radial extension of the opening, it can be ensured that the support body fulfills as well as possible its supporting function despite the opening. In axial direction, the opening may match the length of the compensation element or optionally can be smaller. It is understood that the compensation element can be introduced also through an opening at the end face into the tubular support body so that providing an opening on the jacket side of the support body is not required.

In a further embodiment, the support body is put together of at least two parts that are fastened to each other in particular in axial direction or in radial direction. These parts can form in particular two halves of the support body that, in axial or in radial direction, are fit together or locked to each other in that noses provided on one of the respective parts are brought into engagement with grooves of a matching shape on the other part, respectively. The noses or the matching grooves can be designed in various ways, for example, circular or cylindrical, elongate, of rectangular shape or square shape or rib-shaped.

In a further embodiment, the support body has on at least one end face, preferably on both end faces, a contact surface for the compensation element. The latter can be axially secured by contact of the compensation element on the contact surfaces.

In another embodiment, the filter device has a housing in which the filter element is arranged. In order to provide for ice compensation also in a volume for receiving liquid that is formed between the filter element and the housing, between the housing and the filter element a further compensation element of elastically deformable material can be arranged. It can also be compressed by the expanding liquid; alternatively, it can also be formed as an elastically deformable jacket part that yields to the liquid pressure with elastic deformation to the exterior, as described in the aforementioned DE 102 20 672 A1.

In a further embodiment the filter element is embodied as a (cylindrical) filter bellows. The filter bellows is comprised typically of pleated filter paper that is folded in accordion fashion and is of a sleeve shape.

Further features and advantages of the invention result from the following description of embodiments of the invention with the aid of the figures in the drawing showing inventively important details and from the claims. The individual features can be realized individually, or several in any combination, in a variant of the invention.

BRIEF DESCRIPTION OF THE DRAWINGS

Embodiments of the invention are illustrated in the schematic drawing and will be explained in the following description. It is shown in:

FIG. 3a a detail of the support body of the filter device of FIG. 1;

FIG. 3b a compensation element for insertion into the support body of FIG. 3a;

FIGS. 4a-c an embodiment of the support body comprising two parts that are connected to each other along the axial direction of the support body.

EMBODIMENT(S) OF THE INVENTION

Figure 1:
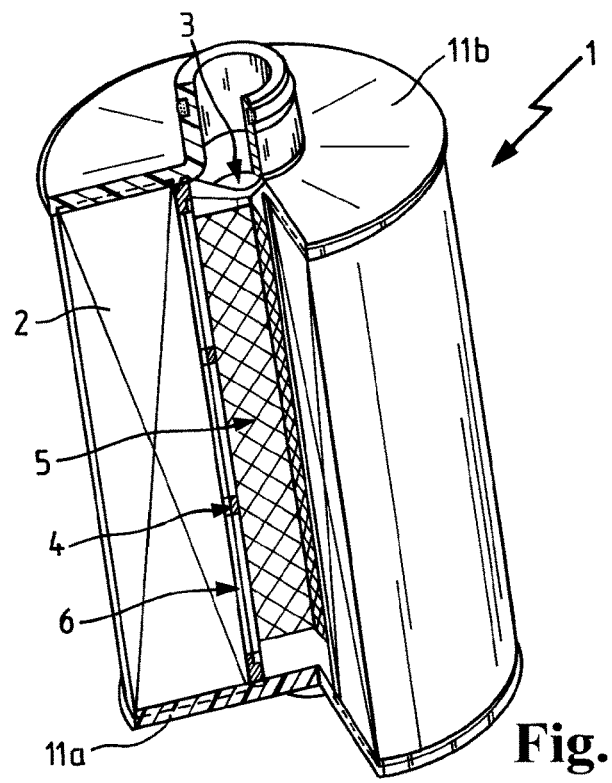
FIG. 1 an embodiment of the filter device according to the invention in a partial longitudinal section view.

The filter device 1 illustrated in FIG. 1 has a cylindrical, circular ring-shaped filter element 2 in the form of a filter bellows. In the filter element 2 a cylindrical interior 3 is formed into which a tubular support body 4 is inserted that extends about the axial length of the filter element 2 and also has cylindrical geometry. In the interior of the support body 4 a cylindrical compensation element 5 is arranged that is comprised of an elastically deformable material, for example, an elastomer (rubber). Between the compensation element 5 and the filter element 2, an annular gap 6 is formed in which the support body 4 is arranged.

Figures 3A, 3B:
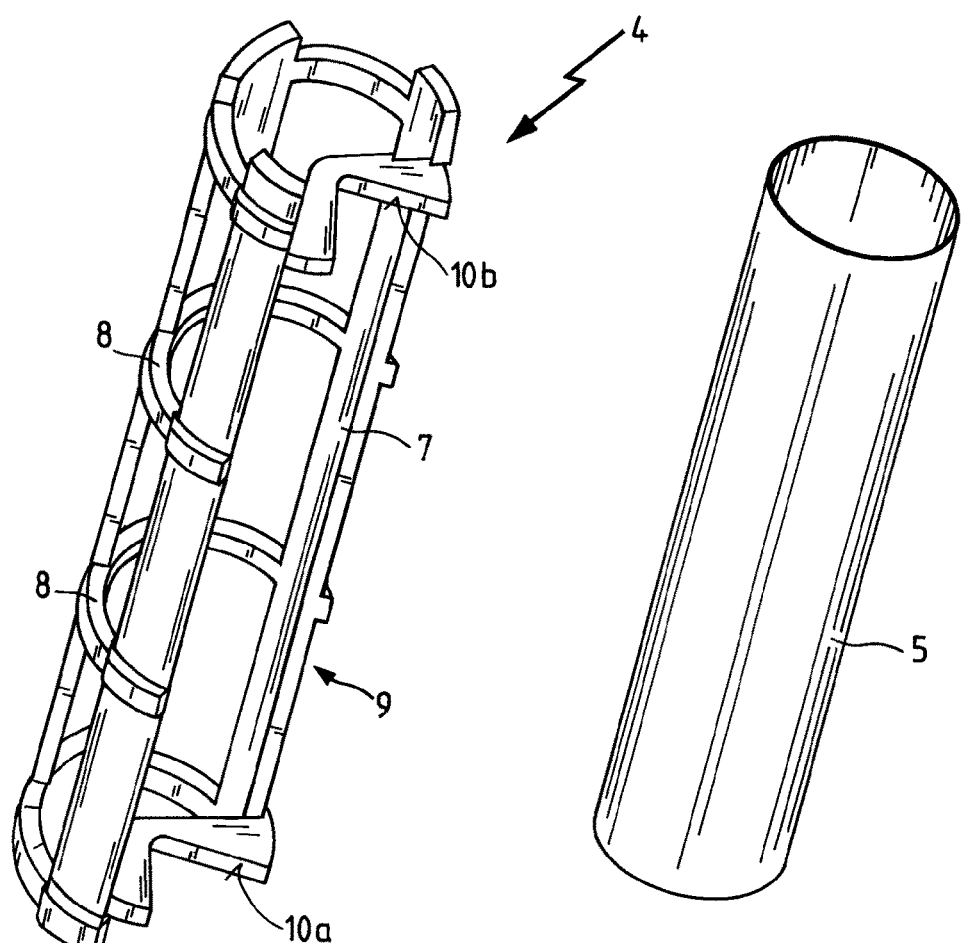

The support body 4 and the compensation element 5 are shown in detail in FIGS. 3a, 3b. The support body 4 is of a grid shape and has three longitudinal webs 7 that are each positioned at an angle of 107.5 degrees relative to each other and are connected with each other by four rings 8 that are distributed along the axial length of the support body 4. The rings 8 of the grid-shaped support body 4 are interrupted at an opening 9 that serves to allow insertion of the compensation element 5. The opening 9 extends about the entire length of the support body 4 and has an opening angle of approximately 110 degrees. The compensation element 5 whose diameter is substantially matching the interior diameter of the support body 4 can be inserted through the opening 9 of smaller size into the support body 4 because the compensation element 5 can be compressed upon insertion into the support body 4. By means of the relatively small opening angle of the opening 9 it is ensured that the support body 4 can fulfill well its supporting function despite the opening 9.

The compensation element 5 is secured in the support body 4 in axial direction on two dovetail-shaped contact surfaces 10a, 10b which are formed on the uppermost and lowermost ring 8, respectively. The support body 4 with inserted compensation element 5 can be secured on the filter element 2, for example, by adhesive connection or by a locking action by means of locking noses provided on the support body 4. In order to maintain in radial direction a satisfactory flow possibility for the liquid, the webs 7 at the level of the rings 8 are provided with steps that serve as spacers. The arrangement of filter element 2, support body 4, and compensation element 5 is secured by two end disks 11a, 11b provided at the end faces and connected to the filter element 4 by an adhesive connection or in a different way.

In the following, with the aid of FIG. 2, the function of the filter device 1 in the mounted state in a housing will be described that is comprised of two housing parts 12a, 12b that are glued to each other in this case. Liquid to be filtered, in the present case an aqueous urea solution, is supplied by inlet 13 at the housing top part 12a to the filter device 1 and passes through an inlet area that is arranged above the filter element 2 into an annular space 14 that is formed between the housing 12a, 12b and the outer wall surface of the filter element 2; this annular space forms the raw side of the filter device 1. In the annular space 14 a further annular cylindrical compensation element 15 of an elastically deformable rubber material is arranged that rests against the inner wall of the housing 12a, 12b.

The liquid to be purified passes in radial direction through the filter element 2 and into the interior 3 that forms the clean side of the filter device 1. The filtered liquid passes through an exit area that adjoins in upward axial direction the interior 3 and exits the filter device 1 in radial direction through an outlet 16.

When the liquid in the annular gap 6 of the interior 3 or in the annular space 14 freezes, the ice pressure that is generated thereby can be compensated by the compensation elements 5, 15 in that they are elastically compressed. In the embodiment shown in FIG. 2, the compensation element 5 that is arranged in the interior 3 can be compressed in axial direction as well as in radial direction while the outer compensation element 15 can be compressed only in radial direction because it extends across the entire axial length of the annular space 14.

Figure 2:
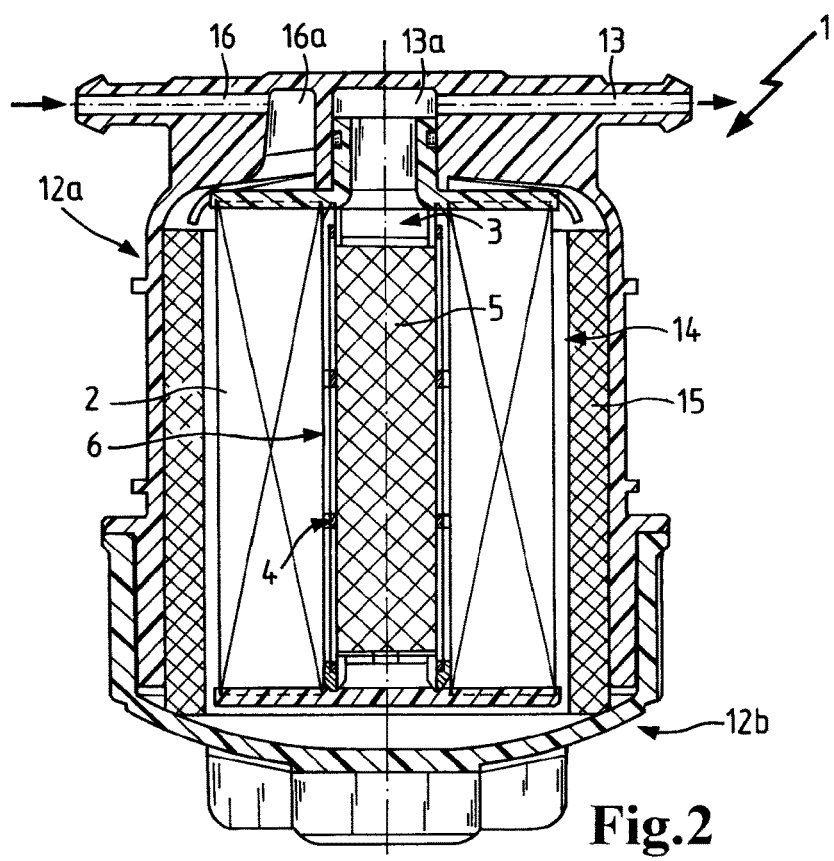
FIG. 2 a longitudinal section of the filter device of FIG. 1 in the mounted state in a housing.

As can be seen also in FIG. 2, it is expedient when the compensation elements 5, 15 fill out a large proportion (expediently more than 40% or 80%) of the volume of the interior 3 or of the annular space 14 because in this way the liquid volume that is contained therein and thus the additional liquid volume to be compensated upon freezing of the liquid is so minimal that it can be compensated completely by an elastic compression of the compensation elements 5, 15. During subsequent thawing of the liquid the compensation elements 5, 15 again fill out the original occupied volume (in the undeformed state).

Figure 5C:
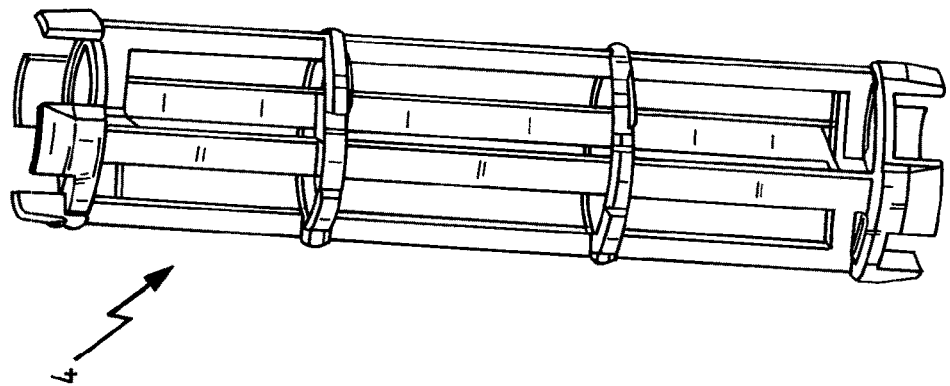
FIGS. 5a-c a further embodiment of the support body with two parts that are connected to each other in radial direction.
Figure 5B:
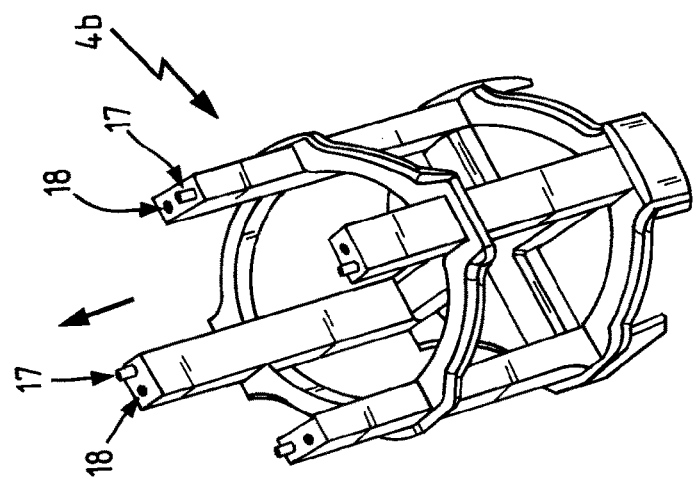
Figure 5A:
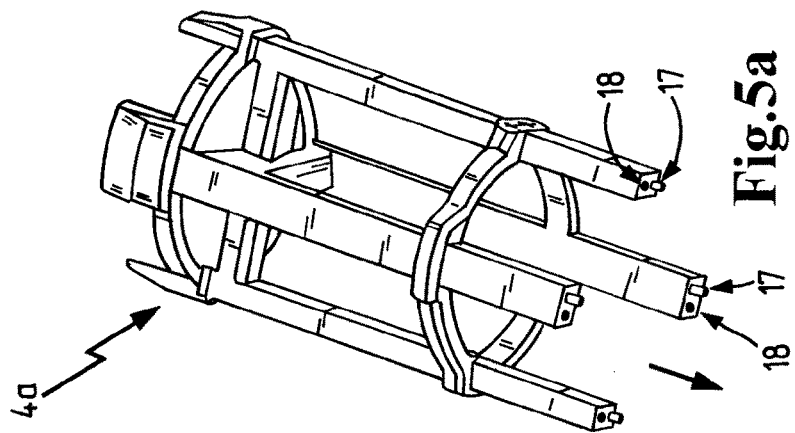

It is understood that the support body may be a one-part configuration as shown in FIG. 3a, but that it can also be combined of two (or more) parts 4a, 4b that, for example, are connected in radial direction or in axial direction to each other as is shown in FIGS. 4a-c or FIGS. 5a-c. The parts 4a, 4b may form in particular two halves of the support body 4 that are attached to each other in that projections or noses 17 formed on each part 4a, 4b are brought into engagement with matching recesses or grooves 18 on the other part 4b, 4a, respectively, after the compensation element 5 has been inserted between the parts 4a, 4b. The noses or the corresponding grooves can be designed in various ways, for example, of a circular shape or cylindrical shape (as shown in FIGS. 5a, b), elongate, rectangular or square (as shown in FIGS. 4a, b) or rib-shaped. It is understood that the noses 17 can also be formed as locking noses. Also, the parts 4a, 4b can be connected non-detachably with each other in other ways, for example, by gluing.

The invention claimed is:

1. A filter device for filtration of a freeze susceptible liquid, comprising:
    a cylindrical filter element comprising:
        a ring-shaped filter bellows having an open central interior extending axially along and encircling a central axis of the cylindrical filter element, wherein a radially outer wall of the ring-shaped filter bellows is a radially outer wall of the cylindrical filter element;
        an annular upper end disk fixed onto an axial end face of the ring-shaped filter bellows, the annular upper end disk having a central flow opening extending through the annular upper end disk into the open central interior;
        a lower end disk fixed onto an opposite axial end face of the ring-shaped filter bellows, the lower end disk closing off the open central interior at the lower end disk;
        a tubular support body arranged within the open central interior, the tubular support body elongated along the central axis;
        the tubular support body arranged within the open central interior, the tubular support body having a circumferential wall in the form of a cage having a plurality of web members;
        a cylindrical, non-tubular body having a circumferentially closed radial outer surface and opposing closed axial end surfaces together defining and enclosing a continuous cylindrical block of elastically deformable material forming a cylindrical body of elastically deformable material;
        wherein the cylindrical body of elastically deformable material is arranged on the central axis, entirely between the annular upper end disk and the lower end disk, and entirely within the open central interior, the cylindrical body of elastically deformable material filling a central interior portion of the open central interior along the central axis, the cylindrical body of elastically deformable material having a material volume filling at least 40% of the open central interior when in an undeformed state;
        wherein the cylindrical body of elastically deformable material is arranged entirely within the open central interior, the cylindrical body of elastically deformable material spaced axially away from both the annular upper end disk and the lower end disk;
        wherein the cylindrical body of elastically deformable material has an outer diameter that substantially matches an interior diameter of the tubular support body, such that the cylindrical body of elastically deformable material is supported on and directly against a radially inner side of the tubular support body;
        wherein an annular gap for liquid flow is formed between a radial outer surface of the cylindrical body of elastically deformable material and a radial inner side of the cylindrical filter element;
        wherein the tubular support body is arranged within the annular gap;
        wherein the cylindrical body of elastically deformable material forms a compensation element which is adapted to compress in volume as the freeze susceptible liquid in the open central interior freezes and expands.

2. The filter device according to claim 1, wherein said tubular support body is of a one-piece monolithic configuration,
    wherein said tubular support body has a circumferential wall in the form of a cage, said tubular support body including
        a plurality of circumferentially spaced axially extending longitudinal web members;
        a plurality of axially spaced ring members, said plurality of axially spaced ring members contacting and connected onto the plurality of circumferentially spaced axially extending longitudinal web members;
    wherein the tubular support body includes an open interior of the tubular support body into which said compensation element is inserted;
    wherein at least some of the plurality of axially spaced ring members are adjacent and are interrupted on their circumference forming an axially elongated insertion opening having an axial length sized to receive the compensation element into an open interior of the tubular support body through said axially elongated insertion opening in the circumferential wall of the tubular support body.

3. The filter device according to claim 2, wherein said axially elongated insertion opening extends in a radial direction across an angle of less than 270 degrees.

4. The filter device according to claim 3, wherein said axially elongated insertion opening extends in a radial direction across an angle of less than 130 degrees.

5. The filter device according to claim 2, wherein said circumferential wall of the tubular support body comprises at least two parts,
    wherein said two parts are fastened to each other in an axial or in a radial direction.

6. The filter device according to claim 2, wherein
said tubular support body has two axially opposing end faces;
wherein at least one of the two axially opposing end faces includes a contact member having a contact surface that extends fully across the open interior of the tubular support body from one opposing side to another, the contact member operable to axially secure said compensation element within said tubular support body between the two axially opposing end faces by contact of said compensation element onto said contact member.

7. The filter device according to claim 1, further comprising:
a housing into which said cylindrical filter element is arranged, the housing comprising:
a first housing part defining a first portion of a chamber into which the cylindrical filter element is installed;
a second housing part defining a second portion of the chamber into which the cylindrical filter element is installed.

8. The filter device according to claim 7, wherein
a second volume for receiving liquid is formed between an exterior of said cylindrical filter element and said housing,
wherein said filter device further includes
a further compensation element of an elastically deformable material arranged within the second volume and operable to compensate for volume expansion of said second volume liquid as it freezes by compressing said further compensation element to a reduced volume.

* * * * *